(12) United States Patent
Moss et al.

(10) Patent No.: US 10,718,644 B1
(45) Date of Patent: Jul. 21, 2020

(54) SENSOR HEAD FOR INSERTION ELECTROMAGNETIC FLOW METER

(71) Applicant: DWYER INSTRUMENTS, INC., Michigan City, IN (US)

(72) Inventors: Robert Austin Moss, Saint Joseph, MI (US); Alejandro Ignacio Baez Guada, Chicago, IL (US); Shilei Ma, Wilmette, IL (US); Jeff Meuili, LaPort, IN (US)

(73) Assignee: DWYER INSTRUMENTS, INC., Michigan City, IN (US)

( * ) Notice: Subject to any disclaimer, the term of this patent is extended or adjusted under 35 U.S.C. 154(b) by 13 days.

(21) Appl. No.: 16/239,029

(22) Filed: Jan. 3, 2019

(51) Int. Cl.
*G01F 1/58* (2006.01)
*G01F 1/60* (2006.01)

(52) U.S. Cl.
CPC .............. *G01F 1/584* (2013.01); *G01F 1/586* (2013.01); *G01F 1/588* (2013.01); *G01F 1/60* (2013.01)

(58) Field of Classification Search
CPC ........................................................ G01F 1/58
See application file for complete search history.

(56) References Cited

U.S. PATENT DOCUMENTS

| 5,303,602 A * | 4/1994 | Morgan | G01F 1/40 73/866.5 |
| 5,497,666 A * | 3/1996 | Patten | G01F 1/849 73/861.355 |
| 6,431,011 B1 | 8/2002 | Feller | |
| 6,463,807 B1 | 10/2002 | Feller | |
| 2016/0187170 A1 * | 6/2016 | Strom | G01F 1/46 73/861.67 |

* cited by examiner

*Primary Examiner* — Jewel V Dowtin
(74) *Attorney, Agent, or Firm* — Tarolli, Sundheim, Covell & Tummino LLP

(57) ABSTRACT

An apparatus for measuring flow in a conduit includes a sensor head configured for insertion transversely through a conduit sidewall to position the sensor head in an electrically conductive fluid flowing through the conduit. The sensor head includes a core and a coil that at least partially surrounds the core, the coil being excitable to generate an electromagnetic field. The sensor head also includes first and second electrodes spaced apart from each other, and a body that supports the coil, core, and electrodes. The body includes at least one channel through which the electrically conductive fluid flows. The electrodes are positioned in the at least one channel. Each channel is defined by opposing sidewalls that have a converging configuration.

27 Claims, 13 Drawing Sheets

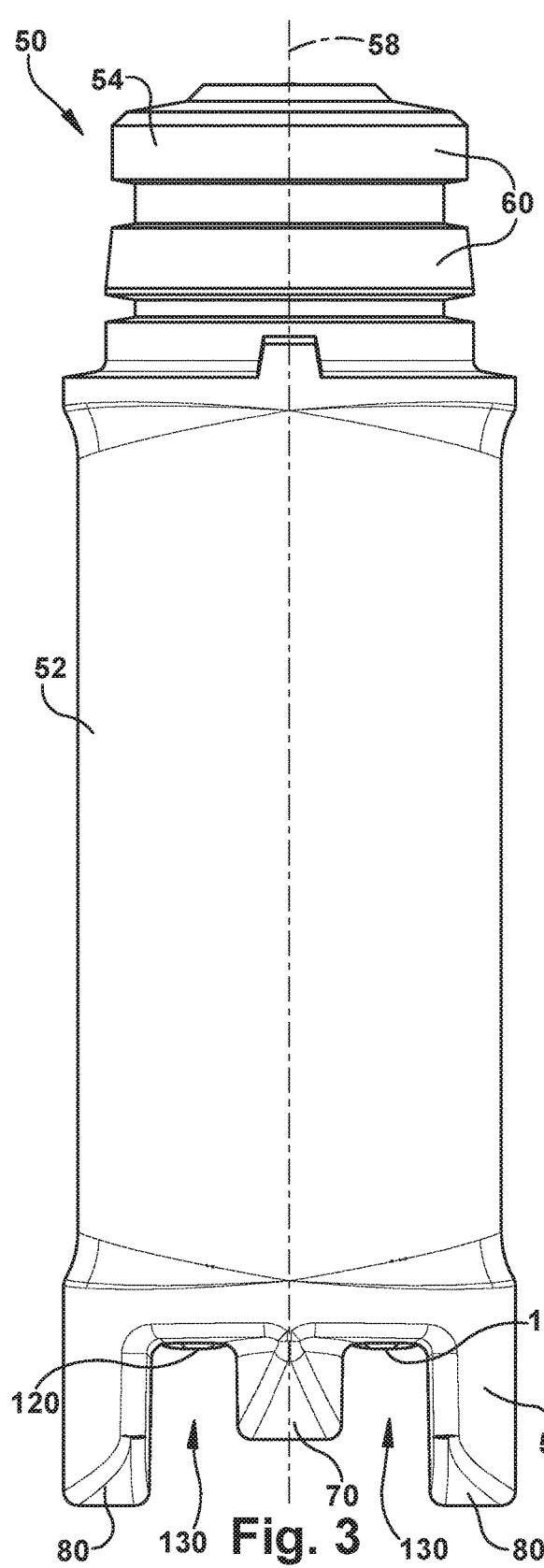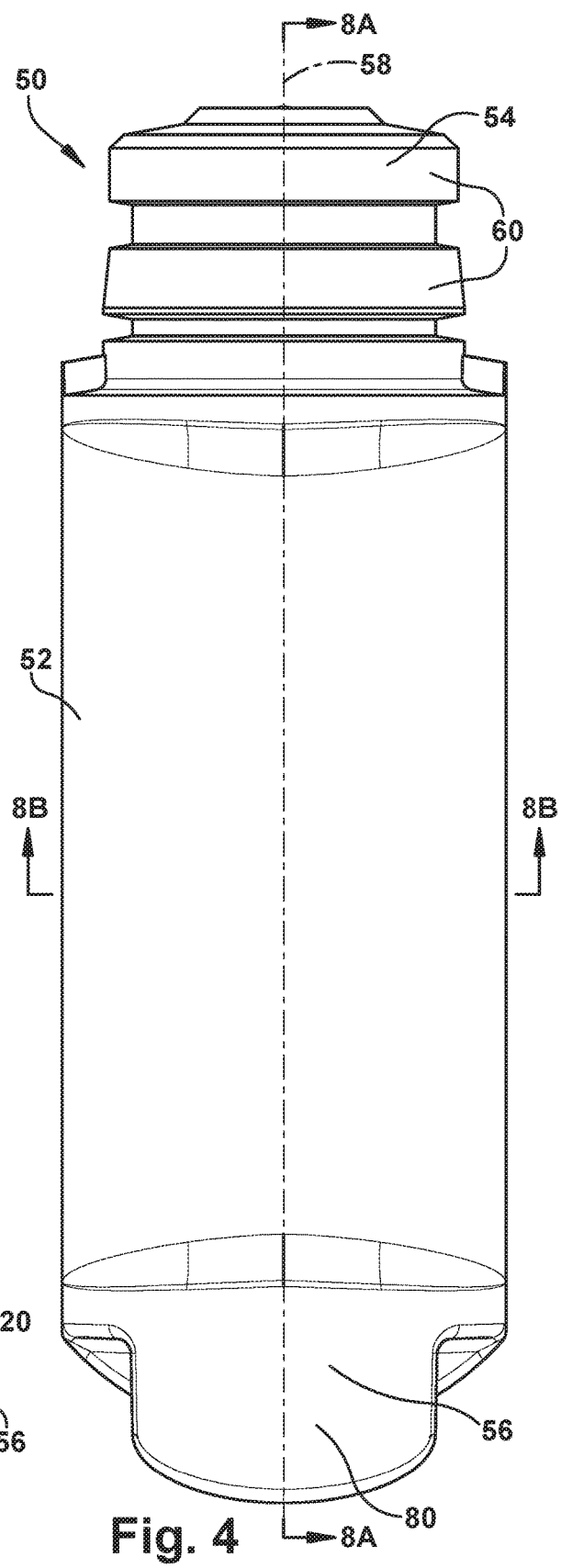

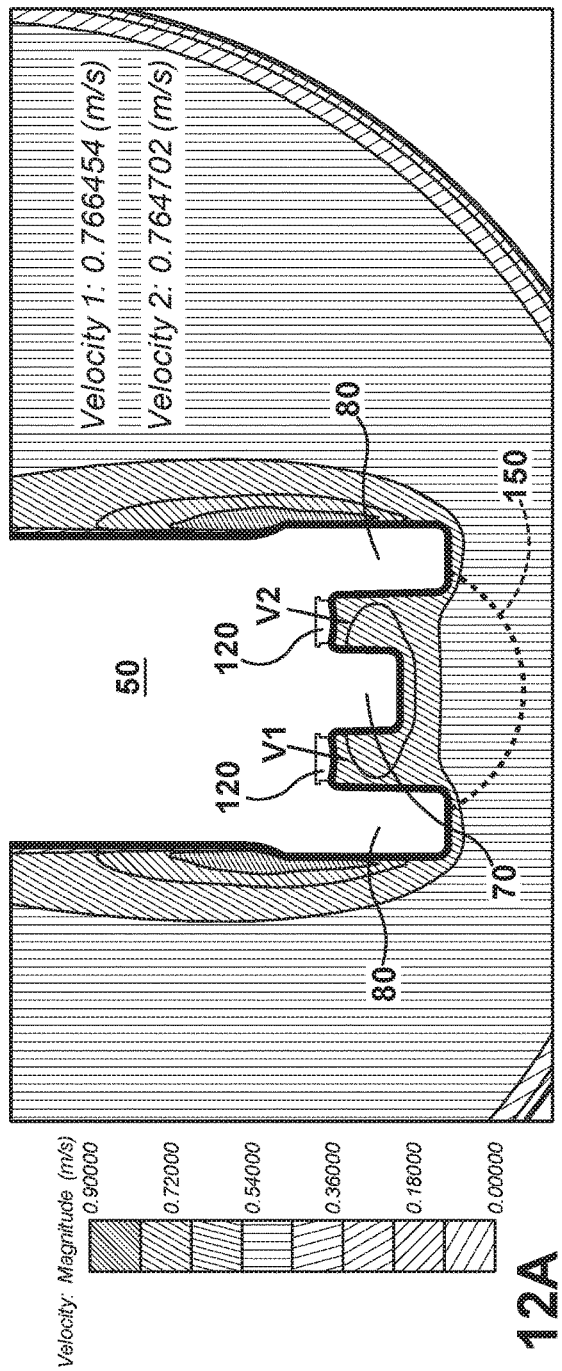
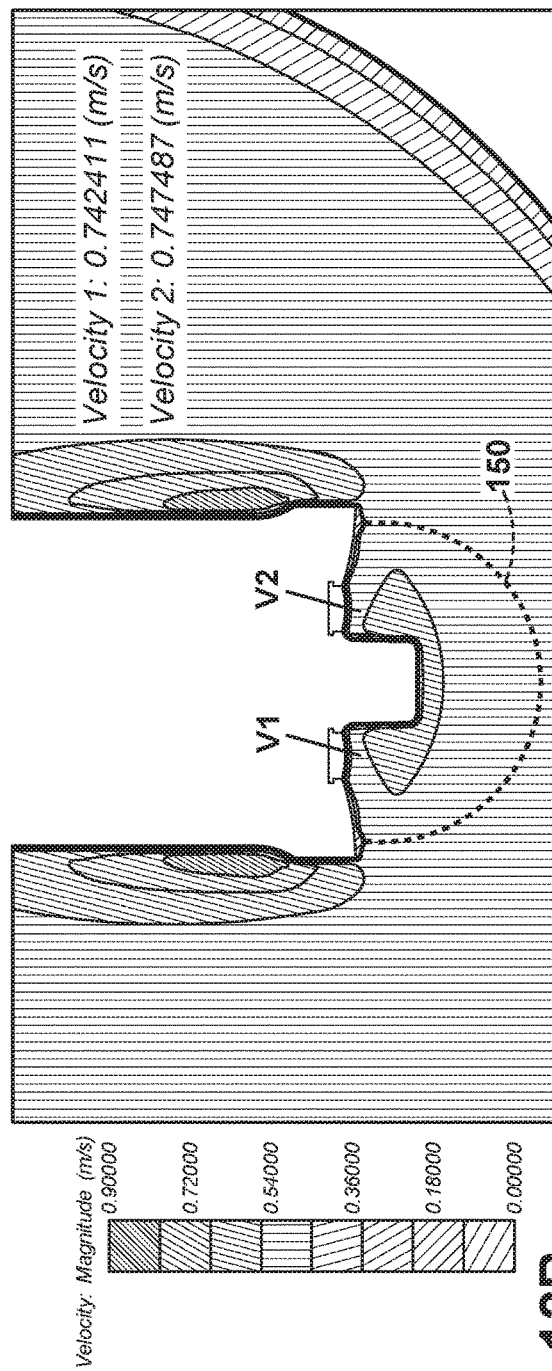
Fig. 12A
Fig. 12B

SENSOR HEAD FOR INSERTION ELECTROMAGNETIC FLOW METER

TECHNICAL FIELD

This disclosure relates to electromagnetic flow meters. In particular, this disclosure relates to insertion-type electromagnetic flow meters. More specifically, this disclosure relates to a sensor head for an insertion-type electromagnetic flow meter.

BACKGROUND

There are various types of meters for measuring fluid flow in a conduit. One particular type of flow meter is an electromagnetic flow meter. Electromagnetic flow meters use Faraday's Law of electromagnetic induction to measure flow of electrically conductive fluids, such as water. Electromagnetic flow meters use a pair of electrodes positioned in the conduit such they are spaced from each other in a direction perpendicular to the flow direction in the conduit. A coil is excited to produce a magnetic field in the fluid flowing through the conduit past the electrodes.

Electromagnetic flow meters energize the coils, which create a magnetic field. When the conduit is full and the fluid begins to flow, the force of the magnetic field causes the negatively and positively charged particles of the fluid to separate as they pass through the magnetic field. This separation causes an induced voltage between the sensor electrodes. According to Faraday's Law, the magnitude of this voltage is proportional to the average flow velocity in the conduit. The sensor can thus be calibrated using the conduit cross-sectional area to measure flow as a function of the voltage induced across the electrodes.

Applying Faraday's Law to electromagnetic flow meters yields the following equation:

$$E=BVL$$

where:
E is the electrical potential (voltage) across the electrodes;
B is the magnetic flux density;
V is the velocity of the measured fluid; and
L is the effective length, i.e., the distance between the electrodes.

Since L is a constant, it can be seen that the potential/voltage measured across the electrodes is proportional to both the magnetic flux density and the fluid velocity.

In practice, the measured electrical potential (E) for an electromagnetic flow meter is a very weak, low magnitude signal. As a result, the signal-to-noise ratio ("SNR") produced by electromagnetic flow meters can be too low to obtain high accuracy measurements. Based on the equation set forth above, the electrical potential (E) for a given fluid flow can be improved, i.e., increased, by increasing the velocity (V), the flux density (B), or both the velocity and the flux density of the fluid flowing through the conduit.

SUMMARY

The invention relates to an insertion electromagnetic flow meter that utilizes an improved sensor head design that increases both the fluid flow velocity and the magnetic flux density in an effective area of the sensor electrodes. Both of these improvements are brought about by the physical configuration of the sensor head.

According to one aspect, an apparatus for measuring flow in a conduit includes a sensor head configured for insertion transversely through a conduit sidewall to position the sensor head in an electrically conductive fluid flowing through the conduit. The sensor head includes a core and a coil that at least partially surrounds the core and is excitable to generate an electromagnetic field. The sensor head also includes first and second electrodes spaced apart from each other, and a body that supports the coil, core, and electrodes. The body includes at least one channel through which the electrically conductive fluid flows. The electrodes are positioned in the at least one channel. Each channel is defined by opposing sidewalls that have a converging configuration.

According to another aspect, alone or in combination with any other aspect, the electrodes can be positioned on a bottom wall of the at least one channel between the sidewalls.

According to another aspect, alone or in combination with any other aspect, the body can include a central fin positioned between laterally spaced first and second wings on a distal end of the body. A first channel can be defined between the first wing and a first side of the fin. A second channel can be defined between the second wing and a second side of the fin. The first electrode can be positioned in the first channel and the second electrode can be positioned in the second channel.

According to another aspect, alone or in combination with any other aspect, the first wing can include a convex surface presented inward toward the first channel, and the second wing can include a convex surface presented inward toward the second channel.

According to another aspect, alone or in combination with any other aspect, the first and second sides of the fin can include convex surfaces presented inward toward the first and second channels, respectively.

According to another aspect, alone or in combination with any other aspect, the core can be ferromagnetic, can extend between and axially beyond the electrodes, and can have a terminal end portion positioned in the fin.

According to another aspect, alone or in combination with any other aspect, the sensor head can also include a ferromagnetic frame including first and second legs that extend axially along the body on opposite sides of the coil. The first and second legs can extend axially beyond the electrodes. The first leg can have an end portion positioned in the first wing portion. The second leg can have an end portion positioned in the second wing portion.

According to another aspect, alone or in combination with any other aspect, the end portions of the legs can be configured to increase the flux density of the magnetic field in the channels.

According to another aspect, alone or in combination with any other aspect, the end portions of the legs can be configured to increase the flux density of the magnetic field in an effective area of the sensor head.

According to another aspect, alone or in combination with any other aspect, the body can be elongated and configured to be inserted lengthwise into the conduit perpendicular to a fluid flow direction in the conduit. The at least one channel and the electrodes can be disposed at a distal end of the body.

According to another aspect, alone or in combination with any other aspect, the body can be configured to position the electrodes at equal insertion depths in the conduit. The body can be configured to align the electrodes with each other along an axis that is perpendicular to the fluid flow direction in the conduit. The body is configured to align the at least one channel parallel to the fluid flow direction in the conduit.

According to another aspect, alone or in combination with any other aspect, the converging sidewalls of the at least one channel can be configured to reduce the cross-sectional area of the at least one channel in order to increase the flow velocity of the electrically conductive fluid flowing through the at least one channel.

According to another aspect, alone or in combination with any other aspect, the first electrode can be positioned in a first channel and the second electrode can be positioned in a second channel.

According to another aspect, alone or in combination with any other aspect, the body can be elongated, cylindrical, and have a central axis. The first and second channels can extend parallel to each other across a distal end of the cylindrical body, perpendicular to the central axis.

According to another aspect, alone or in combination with any other aspect, the sensor head can be configured so that, in use, the central axis extends perpendicular to the fluid flow direction in the conduit and the channels extend parallel to the fluid flow direction in the conduit.

According to another aspect, alone or in combination with any other aspect, the body can be overmolded onto the core, coil, frame, and electrodes.

According to another aspect, alone or in combination with any other aspect, the core, coil, and frame can be assembled to each other prior to the body being overmolded.

According to another aspect, alone or in combination with any other aspect, the body can include a non-cylindrical streamlined portion having a major axis oriented parallel to the at least one channel.

According to another aspect, alone or in combination with any other aspect, an apparatus for measuring flow in a conduit includes a sensor head configured for insertion transversely through a conduit sidewall to position the sensor head in an electrically conductive fluid flowing through the conduit. The sensor head includes a core and a coil that at least partially surrounds the core, the coil being excitable to generate an electromagnetic field. The sensor head also includes first and second electrodes spaced apart from each other at a distal end of the sensor head. The sensor head further includes a ferromagnetic frame comprising first and second legs that extend axially along the body on opposite sides of the coil. The first and second legs extend axially beyond the first and second electrodes. The first and second electrodes are positioned between the first and second legs. The first and second legs are configured to increase the flux density of the magnetic field in the vicinity of the first and second electrodes.

According to another aspect, alone or in combination with any other aspect, the core can extend between and axially beyond the first and second electrodes. The core can be configured to further increase the flux density of the magnetic field in the vicinity of the first and second electrodes.

According to another aspect, alone or in combination with any other aspect, the sensor head can also include a body that supports the coil, the core, the frame, and the electrodes. The body can include a distal end portion that can include a central fin that extends between and axially beyond the first and second electrodes and in which the distal end of the core terminates. The distal end portion can also include spaced apart first and second wings that extend axially beyond the first and second electrodes. The first leg of the frame can terminate in the first wing. The second leg of the frame can terminate in the second wing. The first and second electrodes can be positioned between the wings.

According to another aspect, alone or in combination with any other aspect, the body can also include a first channel having a bottom wall upon which the first electrode is disposed and opposing sidewalls defined by the first wing and the fin. The body can also include a second channel having a bottom wall upon which the second electrode is disposed and opposing sidewalls defined by the second wing and the fin.

According to another aspect, alone or in combination with any other aspect, the opposing sidewalls of the first and second channels can have a converging configuration.

According to another aspect, alone or in combination with any other aspect, the body can be elongated and configured to be inserted lengthwise into the conduit. The first and second electrodes can be aligned with each other along an axis that is perpendicular to the fluid flow direction in the conduit. The first and second channels can be aligned parallel to the fluid flow direction in the conduit.

According to another aspect, alone or in combination with any other aspect, the converging sidewalls of the first and second channels can be configured to reduce the cross-sectional areas of the first and second channels in order to increase the flow velocity of the electrically conductive fluid flowing through the first and second channels.

According to another aspect, alone or in combination with any other aspect, the body can be elongated, cylindrical, and have a central axis. The first and second channels can extend parallel to each other across a distal end of the cylindrical body, perpendicular to the central axis.

According to another aspect, alone or in combination with any other aspect, the sensor head can include a non-cylindrical streamlined portion having a major axis oriented parallel to the at least one channel.

DRAWINGS

FIG. 3 is a front view of the sensor head.

FIG. 4 is a side view of the sensor head.

FIGS. 12A and 12B are charts illustrating fluid flow velocities in the vicinity of electrodes of different sensor head configurations under controlled conditions.

DESCRIPTION

Figure 1:
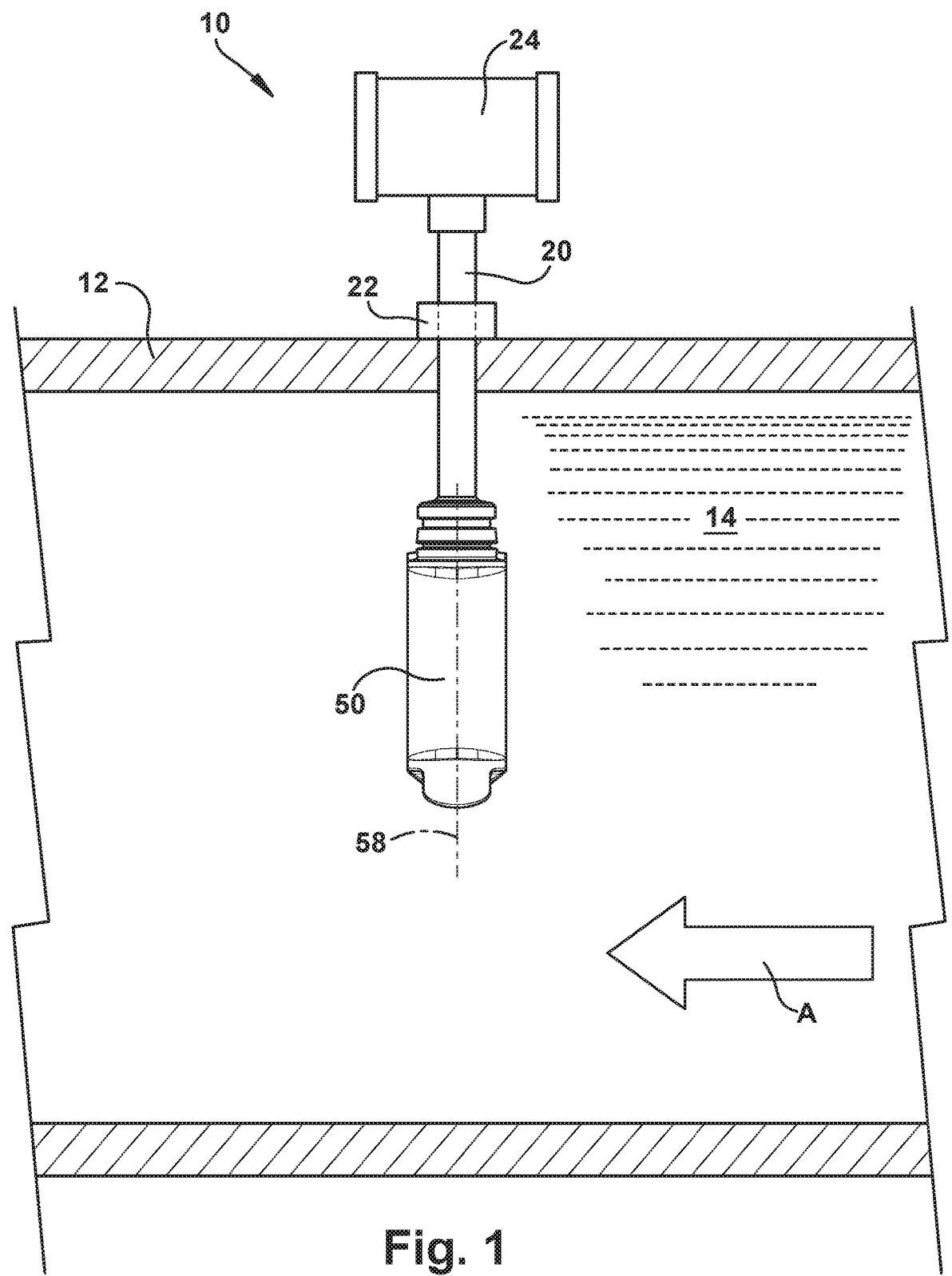
FIG. 1 is a side view illustrating an installed condition of an electromagnetic flow meter to one example configuration.
Figure 2:
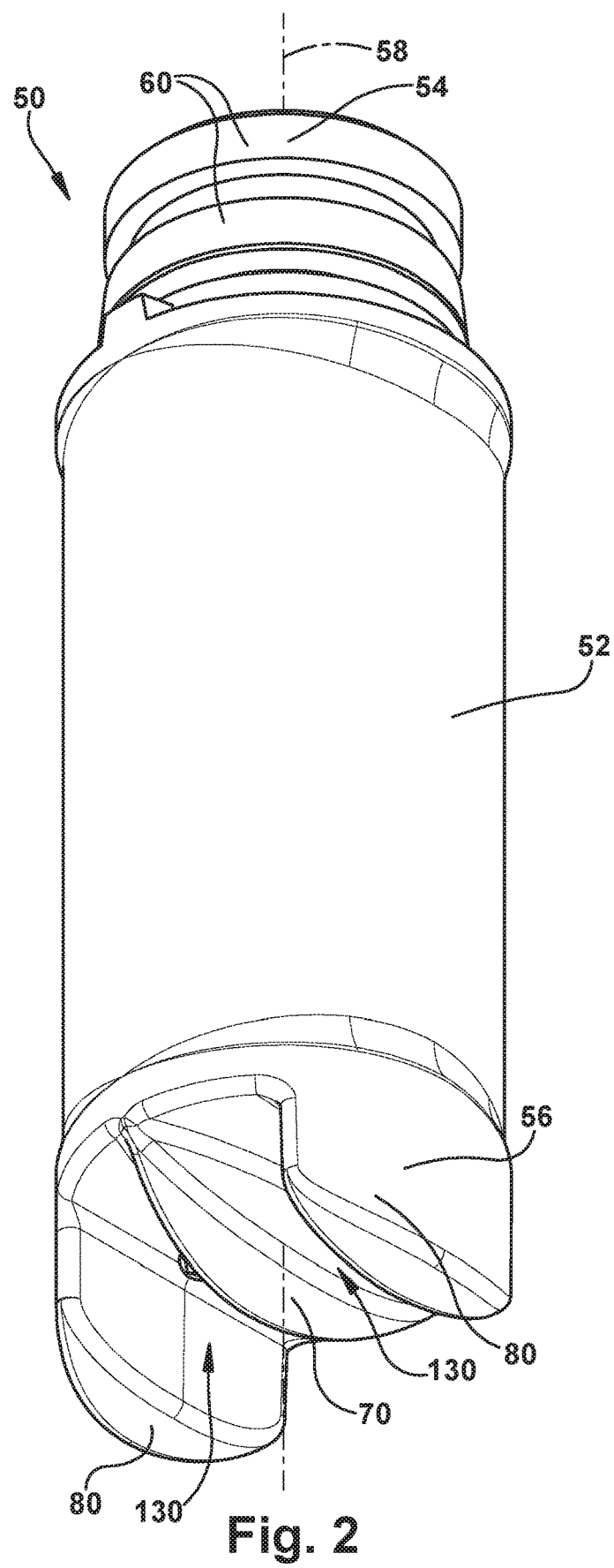
FIG. 2 is a perspective view of a sensor head portion of the electromagnetic flow meter.
Figure 5:
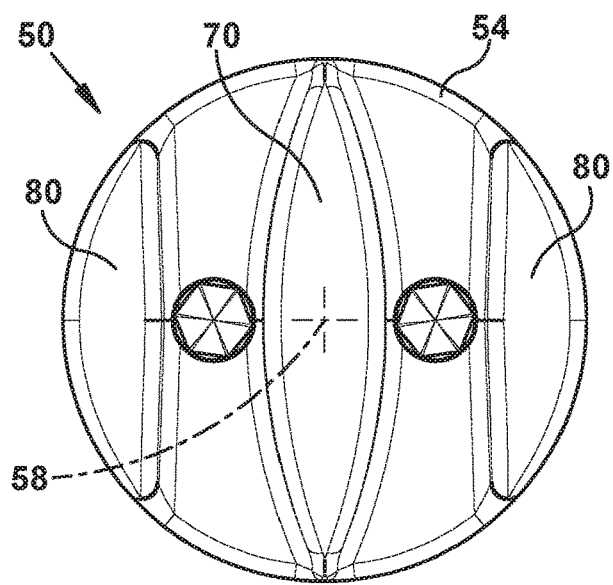
FIG. 5 is a bottom view of the sensor head.

Referring to FIG. 1, an apparatus 10, referred to herein as an electromagnetic flow meter or, simply, flow meter, measures the flow of fluid 14 in a conduit 12. FIG. 1 is an example illustration and the relative scales or sizes of the various components depicted therein may or may not be accurate or drawn to scale. The fluid 14 in the conduit flows in a flow direction indicated generally by the arrow labeled "A" in FIG. 1. The flow meter 10 is of a type sometimes referred to as an insertion flow meter. Characteristic of this type of meter, the flow meter 10 can include a probe 20 that is inserted transversely, e.g., perpendicularly, through the conduit wall into the fluid 14 flowing in the conduit 12. The conduit 12 can be fitted with a tap 22 or other fitting that permits the insertion of the probe 20 and supports the flow meter 10 on the conduit. In one example configuration, the tap 22 can be a compression or NPT fitting that facilitates probe insertion and provides a fluid-tight seal. In another example configuration, the tap 22 can be a hot-tap device including a valve that allows for inserting the probe 20 while the fluid 14 is flowing in the conduit 12.

The probe 20 supports a sensor head 50 at its distal end. The probe 20 is inserted into the conduit 12 so as to position the sensor head 50 at a desired position in the conduit. The flow meter 10 also includes a sensor electronics unit 24 positioned at the proximal end of the probe 20, outside the conduit 12. The sensor electronics unit 24 includes electronics for interrogating the sensor head 50 in order to obtain a signal indicative of the level of fluid flow in the conduit 12, and for producing an output (wired and/or wireless) for transmitting a signal indicative of the measured fluid flow. The precise type and configuration of the probe 20, tap 22, and sensor electronics unit 24 is not important, as long as they can accommodate the sensor head 50 and its implementation as set forth herein.

The sensor head 50 is an electromagnetic fluid flow sensor head that is configured to measure fluid flow according to the principles of Faraday's Law described above. An example construction of the sensor head 50 is illustrated in FIGS. 2-5.

Referring to FIGS. 2-5, the sensor head 50 includes a body 52 that houses various sensor head components. The body 52 has a proximal, upper end portion 54 and a distal, lower end portion 56. The upper end portion 54 interfaces with a distal end of the probe 20 to secure the sensor head 50 to the probe. The lower end portion 56 is the terminal end of the sensor head 50 and the terminal end of the flow meter 10. It is at the lower end portion 56 of the sensor head 50 where the fluid flowing in the conduit 12 moves through the magnetic field generated by the sensor head and generates an electrical potential across sensor electrodes 112 (see FIG. 5).

In the example configuration of FIGS. 2-5, the body 52 is formed from a corrosion-resistant plastic material, such as PVC, that is overmolded onto internal sensor head components, as described below with reference to FIGS. 7-9. At the upper end portion 54, the overmolded plastic material can form features 60, such as ribs, for facilitating connecting the sensor head 50 to the probe 20. At the lower end portion 56, the overmolded plastic material forms a central fin 70 and lateral wings 80.

Figure 6:
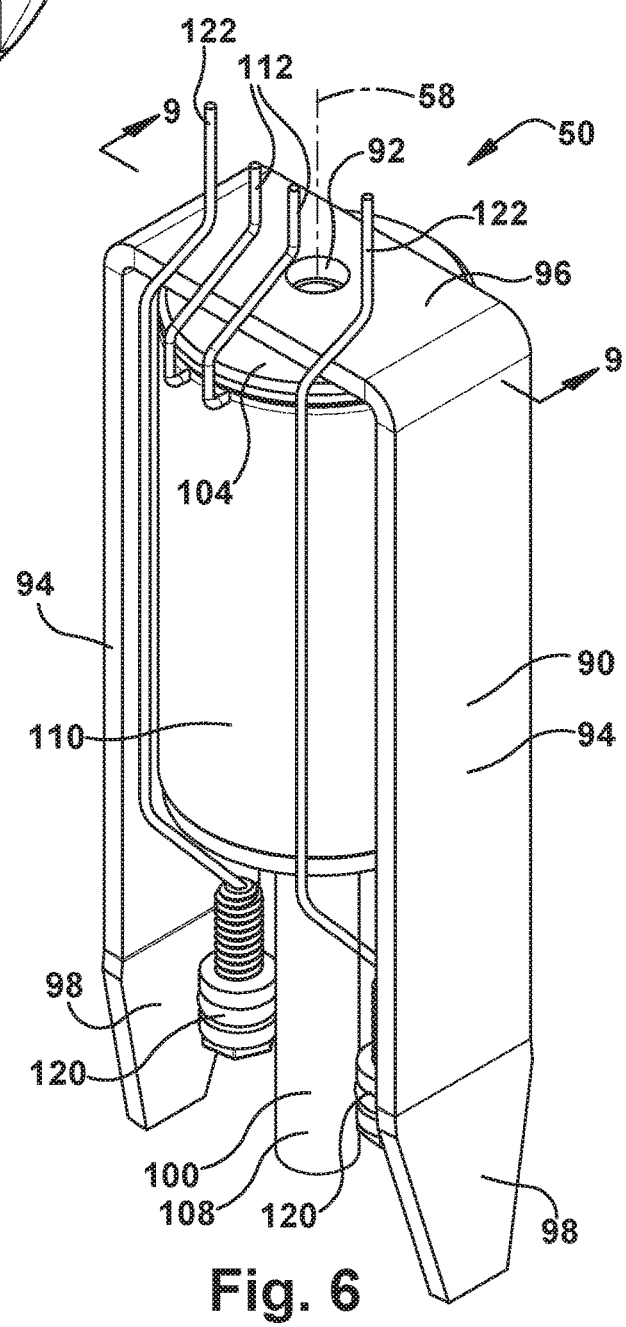
FIG. 6 is a perspective view illustrating the assemblage of certain components of the sensor head.
Figure 7:
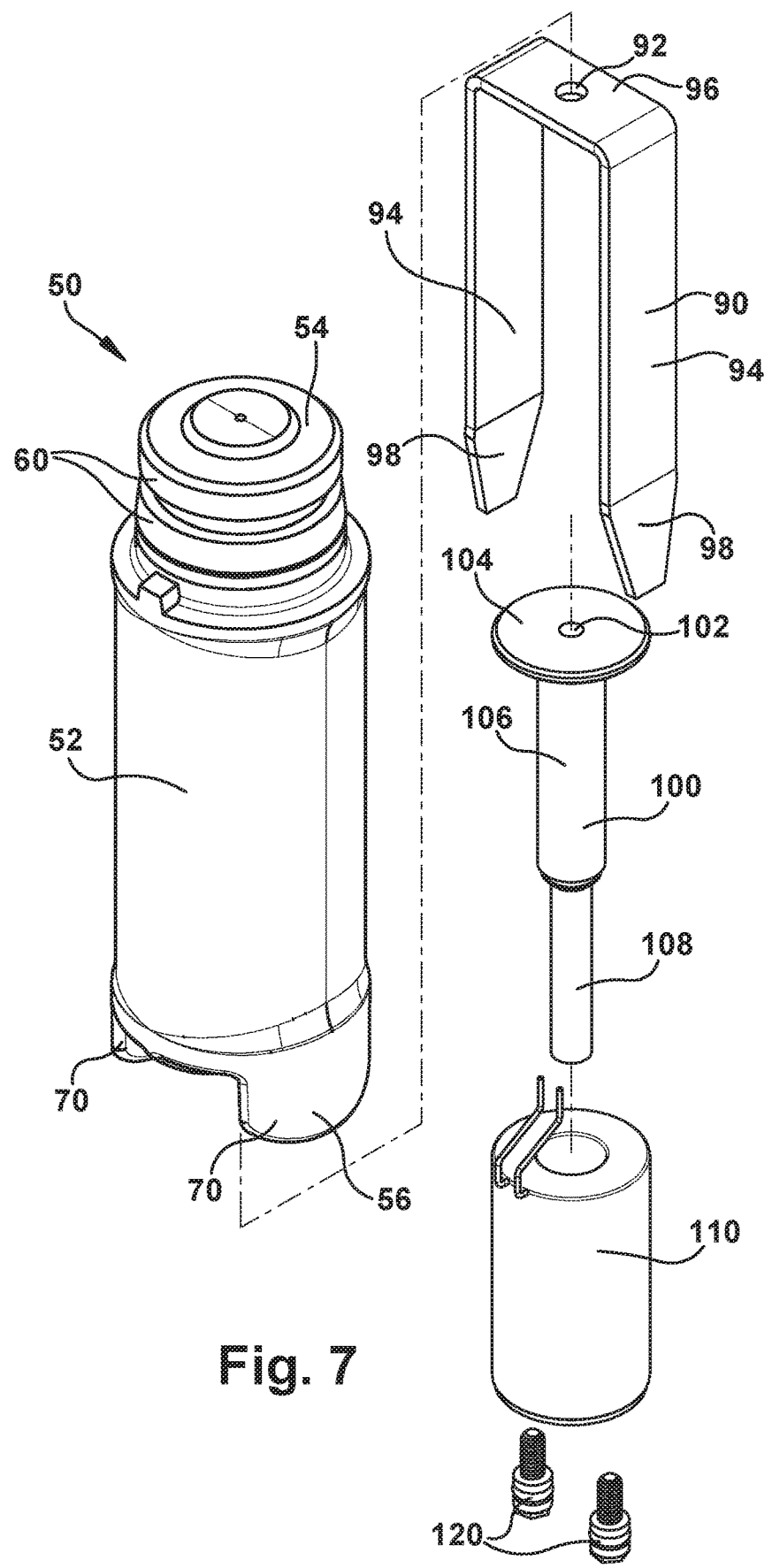
FIG. 7 is an exploded view of the sensor head.

Internal components of an example configuration of the sensor head 50 are illustrated in FIGS. 6-8B. In the exploded view of FIG. 7, the body 52 is illustrated as an exploded component of the sensor head. Those skilled in the art will appreciate that, if the body 52 is an overmolded component, "exploding" or otherwise disassembling the body from the internal sensor head components as implied by FIG. 7 would not be possible. The exploded view of FIG. 7 is therefore for purposes of illustration only, with the recognition that, for an overmolded construction, assembly and/or disassembly is not possible.

For purposes of explanation, reference is made herein to a central longitudinal axis 58 of the sensor head 50. The sensor head 50 includes the following components: a frame 90, a core 100, a coil 110, and a pair of electrodes 120. In the example configuration of FIGS. 6-8B, the frame 90, core 100, and coil 110 are aligned with each other along the axis 58. The frame 90, core 100, coil 110, and electrodes 120 are housed in the body 52. To this end, the body 52 can be a separately constructed (e.g., molded) component into which the other components are installed. Alternatively, the body 52 can be molded (e.g., overmolded) onto the other components (see below).

In the example configuration, the frame 90 can support the core 100 and the coil 110. For example, to facilitate this support, a fastener, such as a screw (not shown), can extend through an opening 92 in the frame 90 into a corresponding opening 102 in the core 100 to secure the core and the coil 110 to the frame. For purposes of simplification, other components, such as fasteners, washers, etc., that may be used to interconnect certain sensor head components are not shown.

Figure 8A:
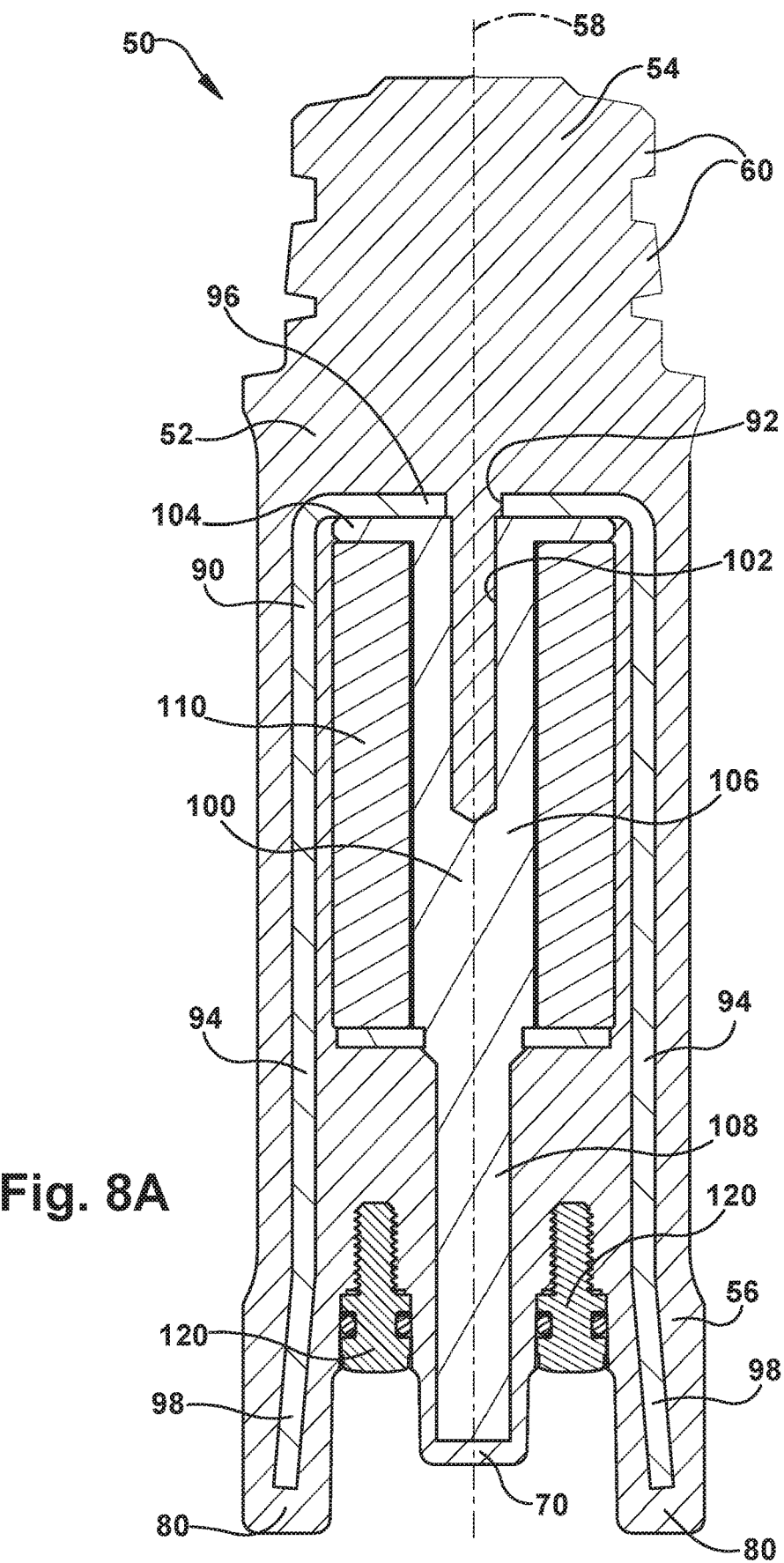
FIG. 8A is a sectional view of the sensor head taken generally along line 8A-8A in FIG. 4.
Figure 8B:
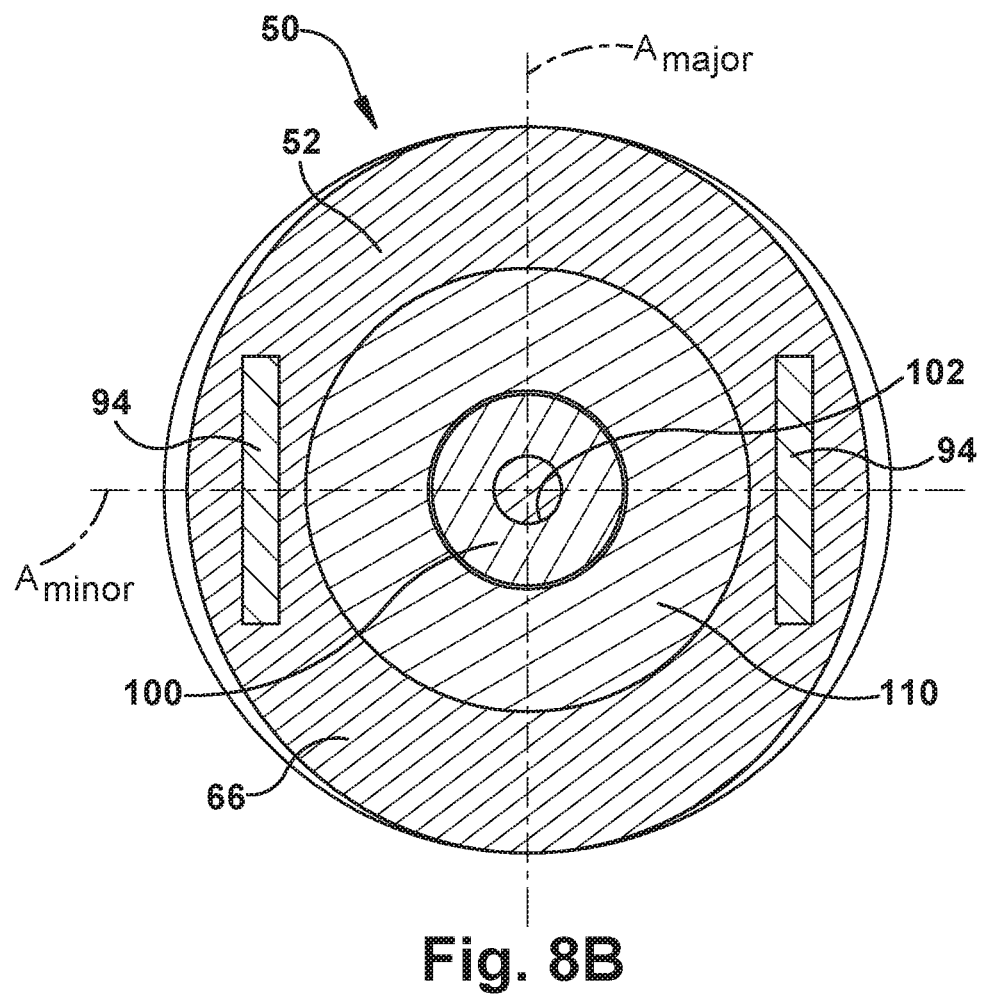
FIG. 8B is a sectional view of the sensor head taken generally along line 8B-8B in FIG. 4.

As shown in FIGS. 8A-8B, the sensor head components can be interconnected via the overmolded plastic material of the body 52, which can surround certain portions and fill certain cavities of the components to thereby interconnect the components. This configuration can be especially advantageous in providing electrical isolation between certain electrically conductive sensor head components, where desired. Those skilled in the art will appreciate that these components can be connected or otherwise supported to each other in any manner that is consistent with and/or facilitates the advantageous features of the sensor head 50 as described herein. As a further example, certain components of the sensor head 50 can be assembled mechanically through interconnections such as fasteners, and partially through the aforementioned overmolding.

The frame 90 is constructed of a high magnetic permeability material, such as carbon steel, and has a generally U-shaped configuration, which is inverted in the figures. The frame 90 includes a pair of spaced apart leg portions 94 that extend parallel to the axis 58 and are interconnected by a cross-member 96. Each leg portion 94 terminates in a flux collecting portion 98. As shown in FIGS. 6-8B, the flux collecting portions 98 van have tapered profiles and can be configured to extend at a slight outward angle relative to the remainder of the leg portions 94 and the axis 58. The flux collecting portions 98 could, however, be configured differently. For example, the flux collecting portions 98 could be non-tapered and/or can extend in a straight, non-angled direction from the remainder of the leg portions 94.

The core 100 is constructed of a high magnetic permeability material, such as carbon steel, and is positioned between the leg portions 94 and has an annular shoulder portion 104 positioned against the cross-member 96. The core 100 includes an elongated cylindrical coil receiving portion 106 that extends from the shoulder portion 104 along the axis 58. The coil 110 is received on the coil receiving portion 106 and is positioned abutting the shoulder 104. The core 100 also includes an elongated cylindrical flux collecting portion 108 that extends from a distal end of the coil receiving portion 106, away from the coil 110, along the axis 58.

Referring to FIG. 6, the sensor head 50 includes electrical leads 112 that are electrically connected to the coil 110 and extend from the coil through the sensor body 52. The sensor head 50 also includes electrical leads 122 that are electrically connected to the electrodes 120 and extend from the electrodes through the sensor body 52. The leads 112, 122 extend from the sensor head 50 through the probe 20 to facilitate an electrical connection between the coil 110 and electrodes 120, respectively, and the electronics of the sensor electronics unit 24.

The sensor head 50 is configured so that the flux collecting portion 108 of the core 100 extends axially beyond the electrodes 120 and terminates in the fin 70. The sensor head 50 is also configured so that the flux collecting portions 98 of the frame leg portions 94 extend axially beyond the electrodes 120 and terminate in respective ones of the wings 80. As shown in FIG. 8A, the flux collecting portions 98 of the legs 94 extend axially beyond the electrodes 120 and axially beyond the flux collecting portion 108 of the core 100.

Advantageously, the configurations of the frame 90, core 100, fin 70 and wings 80 help to improve the performance of the sensor head 50. More specifically, the configurations of these sensor head components help improve the signal-to-noise ratio (SNR) of the sensor head 50. The sensor head components achieve this improvement by: 1) increasing the velocity (V) of the fluid passing through the magnetic field past the electrodes 120, and 2) increasing the flux density (B) of the magnetic field generated at the end 56 of the sensor head 50 through which the measured fluid flows. Recalling Faraday's Law (E=BVL), increasing these B and V values necessarily and advantageously increases the strength or magnitude (E) of the electrical potential measured by the sensor head 50.

Figure 9:
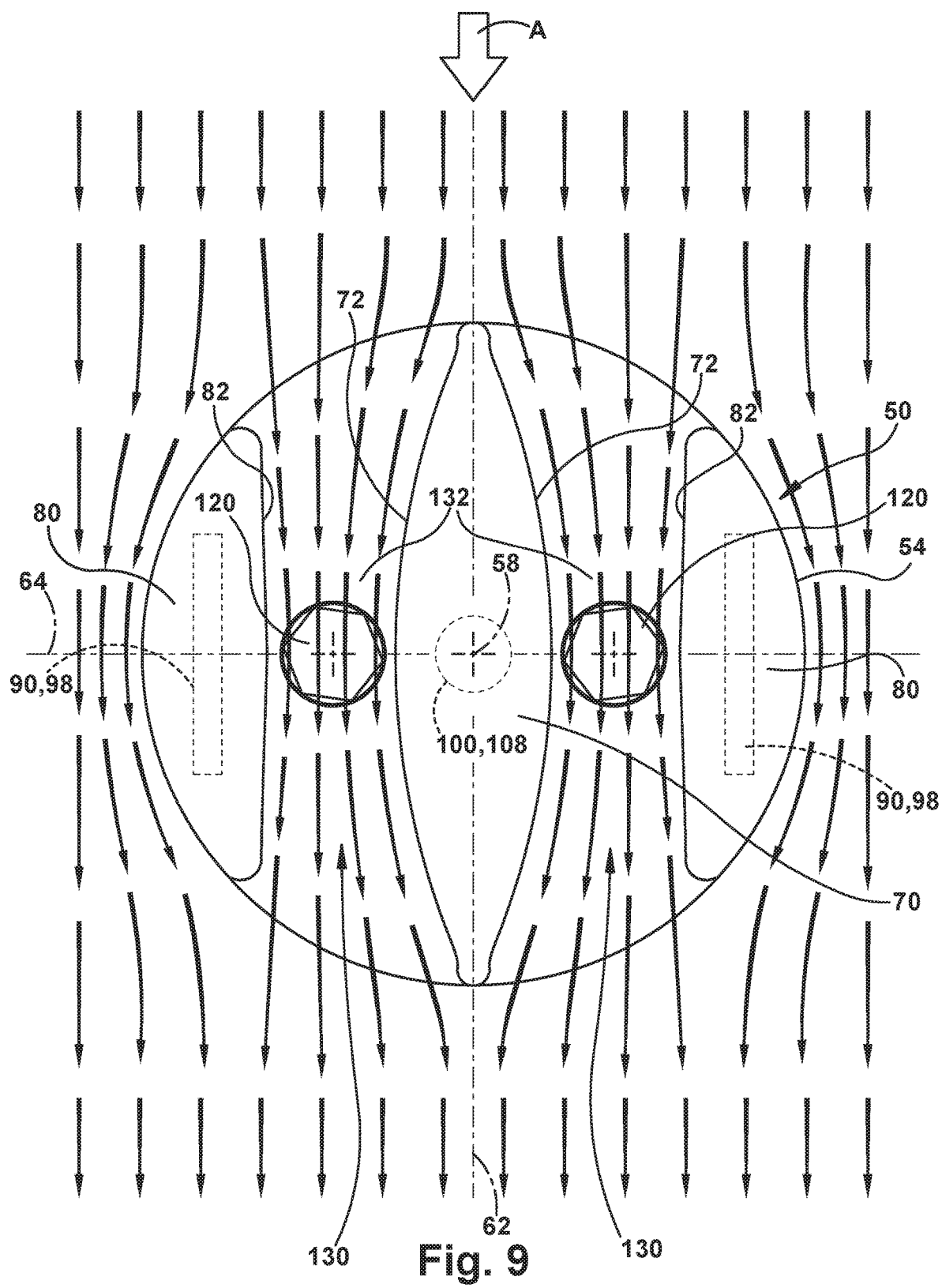
FIG. 9 is a bottom view illustrating fluid flow along relative to certain portions of the sensor head.

Referring to FIG. 9, the fin 70 and the wings 80 define respective channels 130 in which the electrodes 120 are positioned. The electrodes 120 are positioned on respective bottom walls 132 of the channels 130, which span between the fin 70 and the wing 80 associated with their respective channels. The fin 70 has a generally lenticular configuration, in which curved surfaces 72 are presented facing convexly away from each other and toward their respective channels 130. The wings 80 have surfaces 82 presented facing their respective channels 130 and the opposing surface 72 of the fin 70. Together, the surfaces 72 and 82 converge toward each other in the channels 130, reaching an apex at the electrodes 120, and then diverging away from each other.

The fluid flowing past the lower end 54 of the sensor head 50 is indicated generally by the arrows in FIG. 9. The fluid flow direction A is perpendicular to the central axis 58 of the sensor head 50. The fluid flow direction A is also generally parallel to the channels 130. Knowing that at least one of the sidewalls of the each channel 130 is curved, by "parallel" to the channel, it is meant that the flow direction is longitudinal through the channel, parallel to the bottom wall 132 of the channel and to an axis 62 that is parallel to the flow direction A and the axis 58. The electrodes 120 are aligned with each other along an axis 64 that is perpendicular to both the axis 58 and the axis 62.

Viewing FIG. 8B, it can be seen that the body 52 includes a streamlined portion 66 that, in cross-section, has a non-cylindrical configuration selected to streamline the sensor head 50 along the flow direction A (see FIGS. 1 and 9). In the example configuration illustrated in FIG. 8B, the streamlined portion 66 has an elliptical configuration. The streamlined portion 66 extends between the upper end portion 54 and the lower end portion 56 of the body 52. The streamlined portion 66 is configured such that the long or major axis $A_{major}$ of the elliptical cross-section is oriented parallel to the channels 130 and therefore parallel to the flow direction A (see FIGS. 1 and 9) during use. The short or minor axis $A_{minor}$ of the elliptical cross-section extends perpendicular to the major axis $A_{major}$ and the channels 130.

The fluid 14 flowing past the sensor head 50 creates drag and vortex shedding. Drag affects the fluid flow in the conduit, and vortex shedding can produce unwanted effects, such as oscillations and/or vibrations of the sensor head 50 and/or probe 20. This occurs when the vortex shedding has a frequency that matches or approximates the resonant frequency of these structures. Advantageously, the sensor head 50 has a streamlined portion 66 with an elliptical configuration that helps reduce or eliminate both drag and vortex shedding. The streamlined portion 66 can thereby reduce and/or eliminate any induced oscillations/vibrations that result from the fluid 14 flowing past the sensor head 50. The shape and/or dimensions of the elliptical portion of the body 52 (e.g., the lengths major/minor axes) can be configured based on the characteristics of the measured flow, such as the fluid medium, the expected flow velocities, the length of the probe 20, etc. In fact, the streamlined portion 66 can have a streamlined configuration that is non-elliptical but nevertheless reduces or eliminates vortex shedding and the unwanted effects thereof.

Referring back to FIG. 9, as indicated by these arrows, because of the converging-diverging configuration of the channels 130, the velocity of the fluid flowing through the channels increases. This is because the flow rate of the fluid flowing through the conduit 12 past the sensor head 50 remains constant, while the cross-sectional area of the channels 130 through which the fluid flows decreases. For the fluid flow rate to remain constant, the fluid velocity in the area of reduced cross-sectional area in the channels 130, increases. The configurations of the fin 70 and the wings 80 therefore increase the velocity, which produces an increase in the strength or magnitude (E) of the electrical potential measured by the sensor head 50.

Figure 10:
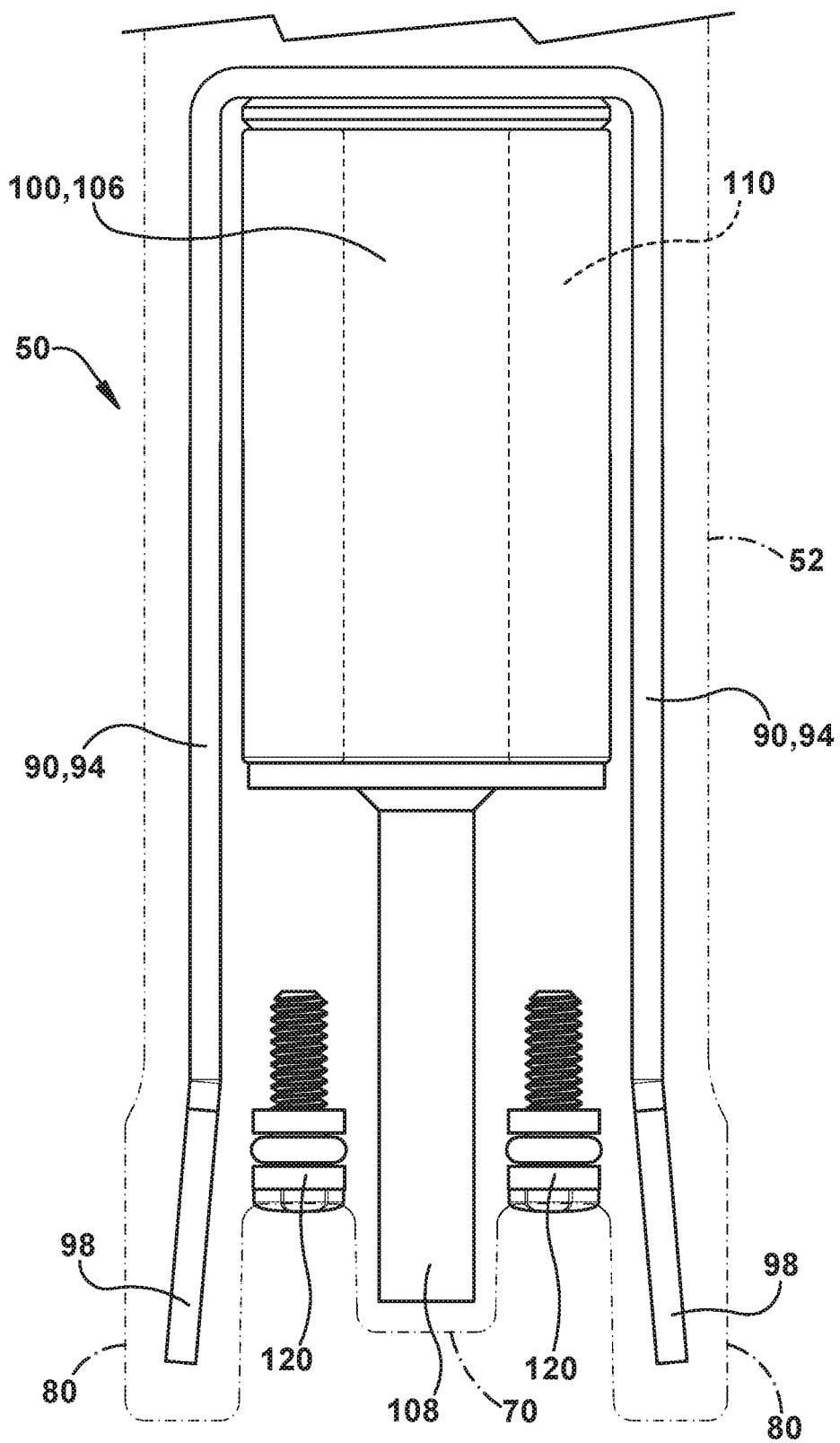
FIG. 10 is a side view of the sensor head with certain portions removed.

Referring to FIG. 10, the electromagnetic components of the sensor head 50 are shown with the non-conductive overmolded body portion 52 illustrated in dashed lines. The electrodes 120 are positioned between the flux collecting portion 108 of the core 100 and the flux collecting portions 98 of the arms 94 of the frame 90. The coil 110 is supported on the coil receiving portion 106 of the core 100, with the arm portions 94 of the frame extending along its outer surface.

The core 100 and the frame 90, being constructed of high magnetic permeability ferromagnetic materials, therefore help collect and direct or concentrate the magnetic flux generated by the coils. Configuring the flux collecting portions 98 of the frame 90 and the flux collecting portion 108 of the core 100 to extend axially beyond the electrodes 120 positions the electrodes between high magnetic permeability materials. As a result, the flux density (B) of the magnetic field in the area of the electrodes 120 and the channels 130 is increased. As a result, for a given fluid velocity, the resulting electrical potential measured across the electrodes 120 is increased compared, for example, to a sensor head configuration in which the core 100 is axially shorter and/or the arms 94 are shorter or non-existent.

Figure 11:
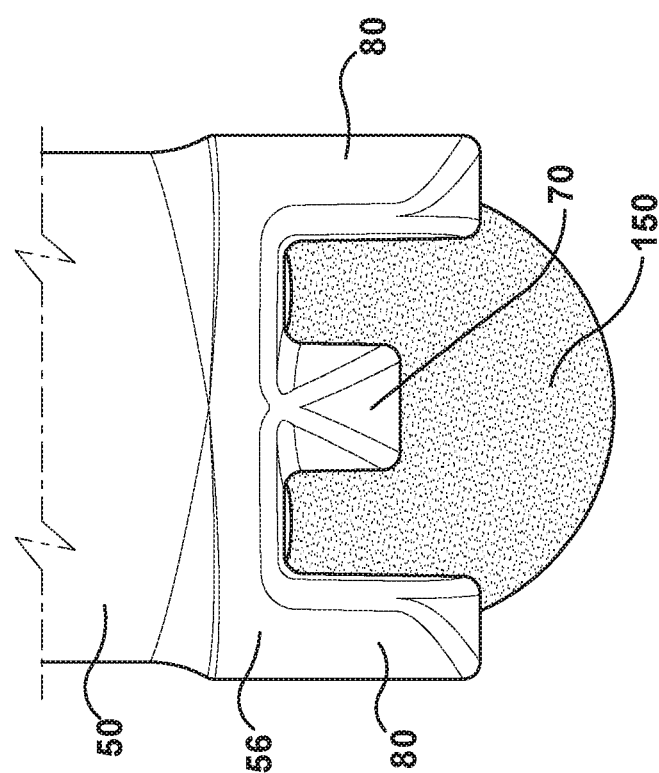
FIG. 11 is a side view illustrating an effective area around a terminal end portion of the sensor head.

When evaluating the performance of the sensor head 50, the focus is on an effective area 150 of the sensor head, which is shown in FIG. 11. The effective area 150 includes the space between the wings 80, between the wings and the fin 70, and within a radius of the end 56 of the sensor head 50. The effective area 150 is the area through which flows the fluid that contributes to the majority of the electrical potential E across the electrodes 120. Fluid flow outside the effective area 150 has little to no effect on the electrical potential E across the electrodes 120.

Figure 13A:
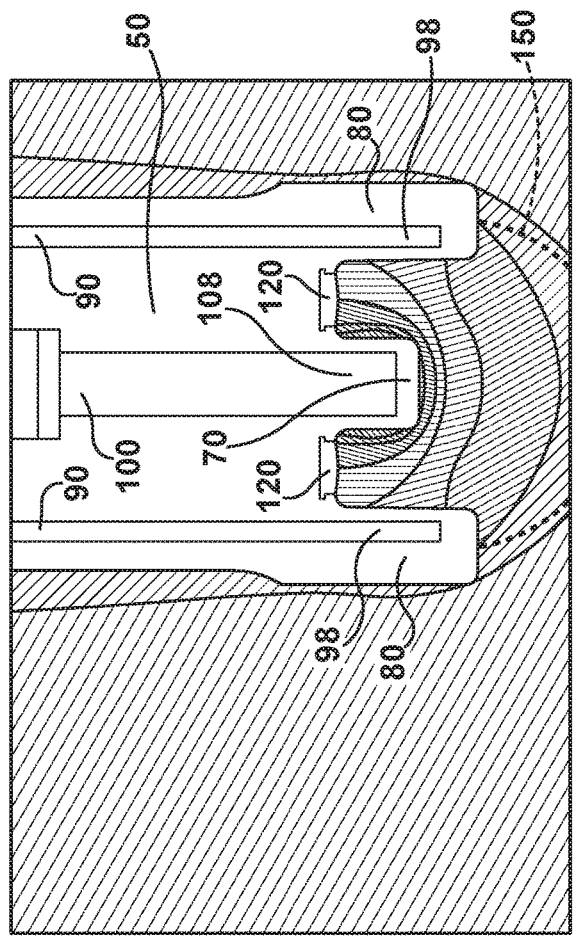
FIGS. 13A and 13B are charts illustrating magnetic flux densities in the vicinity of electrodes of different sensor head configurations under controlled conditions.
Figure 13B:
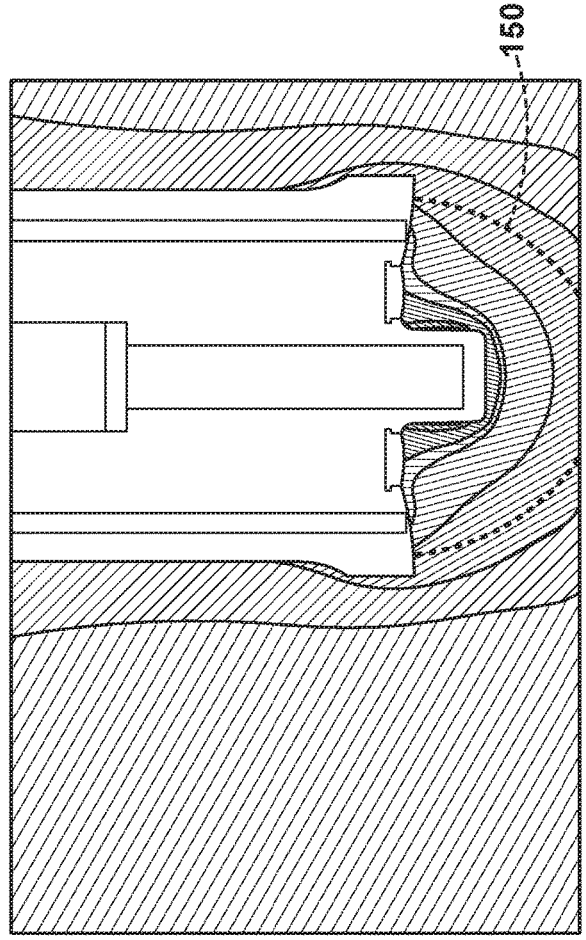
Figure 14A:
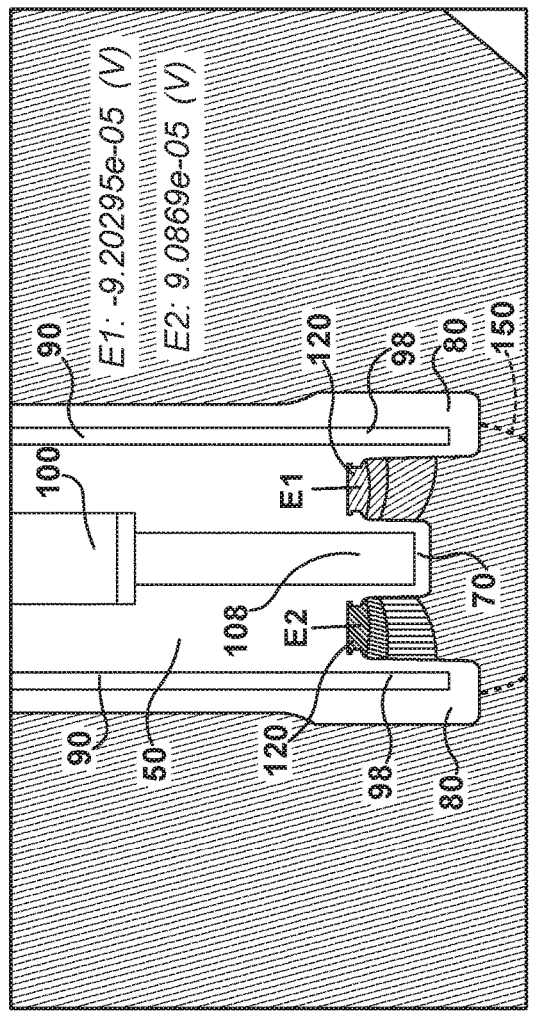
FIGS. 14A and 14B are charts illustrating voltages measured at electrodes of different sensor head configurations under controlled conditions.
Figure 14B:
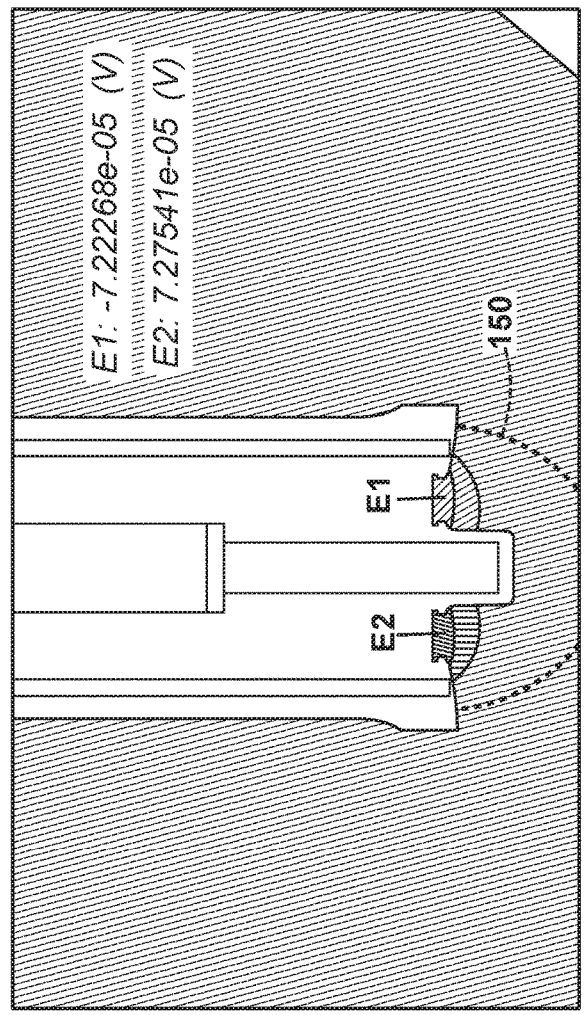

FIGS. 12A-14B illustrate certain performance aspects of the sensor head 50 constructed according to the example configuration of FIGS. 1-11. To illustrate these performance aspects, a sensor head 50 constructed according to the example configuration (FIGS. 12A, 13A, and 14A) is compared to a sensor head that has an identical configuration, with the exception of the wings 80 and the flux collecting portions 98 of the frame are eliminated (FIGS. 12B, 13B, and 14B). Each of these figures illustrates a measured parameter in the effective area 150 for the sensor heads at identical operating conditions. The comparisons illustrated in these figures is therefore illustrative of the effect that the wings 80 and flux collecting portions 98 have on the performance of the sensor head 50 under identical conditions.

FIGS. 12A and 12B illustrate by comparison the velocity V of the fluid flowing in the effective area 150 for the sensor head 50 including wings 80 according to the invention versus a sensor head that does not include wings. In FIGS. 12A and 12B, fluid flowing in the conduit is highly controlled to be identical for both sensor heads. At this controlled fluid velocity, the local velocities in the effective areas 150 are compared. As shown in FIG. 12A, the fluid velocity in the effective area 150 generally, and in the vicinity of the electrodes 120 especially, is greater in magnitude when compared to the sensor head of FIG. 12B. All factors being equal, the velocities of the fluid flowing past the sensor head 50 of FIG. 12A, measured at points V1 and V2 by the electrodes 120, is greater than the corresponding velocities at points V1 and V2 for the sensor head of FIG. 12B The only difference between the sensor heads of FIGS. 12A and 12B that would affect fluid flow in the effective area 150 is the fact that the sensor head 50 of FIG. 12A includes the wings 80, whereas the sensor head of FIG. 12B does not. FIGS. 12A and 12B therefore illustrate the effect that the inclusion of the wings 80 has on the fluid flow characteristics in the effective area 150 of the sensor head 50. The effect is positive, as the wings 80, in combination with the fin 70, create the converging-diverging channels 130 (see FIG. 9) that accelerate the fluid.

FIGS. 13A and 13B illustrate by comparison the magnetic flux density B induced by the coils 110 in the effective area 150 for the sensor head 50 according to the invention, which includes a frame 90 with flux collecting portions 98, versus a sensor head having a frame that does not include flux collecting portions. In FIGS. 13A and 13B, the current applied to the sensor coils is highly controlled to be equal for both configurations. As shown in FIG. 13A, the magnetic flux density B in the effective area 150 generally, and in the vicinity of the electrodes 120 especially, is greater in magnitude when compared to the wingless sensor head of FIG. 13B.

Electromagnetically, the only difference between the sensor heads of FIGS. 13A and 13B that would affect the magnetic flux density B in the effective area 150 is the fact that the frame 90 of the sensor head 50 of FIG. 13A includes the flux collecting portions 98, whereas the frame of the sensor head of FIG. 13B does not. FIGS. 13A and 13B therefore illustrate the effect that the high magnetic permeability flux collecting portions 98 have on the flux density of the electromagnetic field induced by the coils 110 in the effective area 150. The effect is clearly positive, as the flux collecting portions 98 collect, conduct, direct, and/or concentrate the magnetic field such that the flux density B in the effective area 150, especially in the area of the electrodes 120, has a magnitude that is greater than that of FIG. 13B.

The effects that the configuration of the sensor head 50 has on its performance is illustrated in FIGS. 14A and 14B. FIGS. 14A and 14B illustrate by comparison the magnitude of the electrical potential E measured between the electrodes of the sensor heads. The sensor head 50 of FIG. 14A is identical to the sensor heads of FIGS. 12A and 13A. The sensor head of FIG. 14B is identical to the sensor heads of FIGS. 12B and 13B. In FIGS. 14A and 14B, fluid flowing in the conduit is highly controlled to be identical for both sensor heads. At this controlled fluid velocity, the electrical potentials E between their respective electrodes are compared. As shown in FIG. 14A, the electrical potential E is greater in magnitude when compared to the sensor head of FIG. 14B. In the example configuration and test conditions of FIGS. 12A-14B, this difference can amount to a 20% or more increase in measured potential E.

FIGS. 14A and 14B illustrate the effect that the features of the sensor head 50 have on the magnitude of the electrical potential E measured by the sensor head. All things being equal, e.g., for identical flow rates of identical fluids in identical conduits under identical conditions, the measured electrical potential E has a signal strength that is superior to sensor heads that do not include these features, but are otherwise identical. As a result, the sensor head 50 possesses an improved signal-to-noise ratio, which helps to produce measurements that are more accurate and reliable.

While the invention has been described with reference to example configurations, those skilled in the art will appreciate that various changes can be made to the invention and equivalents can be substituted for elements of the invention without departing from the spirit and scope of the invention. Those skilled in the art will also appreciate that modifications can be made to adapt the invention for use in particular applications without departing from the spirit and scope of the invention. It should therefore be understood that the invention should not be limited to any particular configuration or implementation described herein. Instead, the invention can include any configuration falling within the scope of the appended claims.

We claim:

1. An apparatus for measuring flow in a conduit, comprising:
   a sensor head configured for insertion transversely through a conduit sidewall to position the sensor head in an electrically conductive fluid flowing through the conduit, the sensor head comprising:
   a core;
   a coil that at least partially surrounds the core, the coil being excitable to generate an electromagnetic field;
   first and second electrodes spaced apart from each other; and
   a body that supports the coil, core, and electrodes;
   wherein the body comprises at least one channel through which the electrically conductive fluid flows, wherein the electrodes are positioned in the at least one channel, and wherein each channel is defined by opposing sidewalls that have a converging configuration.

2. The apparatus recited in claim 1, wherein the electrodes are positioned on a bottom wall of the at least one channel between the sidewalls.

3. The apparatus recited in claim 1, wherein the body comprises a central fin positioned between laterally spaced first and second wings on a distal end of the body, wherein a first channel is defined between the first wing and a first side of the fin, wherein a second channel is defined between the second wing and a second side of the fin, wherein the first electrode is positioned in the first channel, and wherein the second electrode is positioned in the second channel.

4. The apparatus recited in claim 3, wherein the first wing comprises a convex surface presented inward toward the first channel, and the second wing comprises a convex surface presented inward toward the second channel.

5. The apparatus recited in claim 4, wherein the first and second sides of the fin comprise convex surfaces presented inward toward the first and second channels, respectively.

6. The apparatus recited in claim 3, wherein the core is ferromagnetic, extends between and axially beyond the electrodes, and has a terminal end portion positioned in the fin.

7. The apparatus recited in claim 3, further comprising a ferromagnetic frame comprising first and second legs that extend axially along the body on opposite sides of the coil, wherein the first and second legs extend axially beyond the electrodes, wherein the first leg has an end portion positioned in the first wing portion, and wherein the second leg has an end portion positioned in the second wing portion.

8. The apparatus recited in claim 7, wherein the end portions of the legs are configured to increase the flux density of the magnetic field in the channels.

9. The apparatus recited in claim 7, wherein the end portions of the legs are configured to increase the flux density of the magnetic field in an effective area of the sensor head.

10. The apparatus recited in claim 1, wherein the body is elongated and is configured to be inserted lengthwise into the conduit perpendicular to a fluid flow direction in the conduit, and wherein the at least one channel and the electrodes are disposed at a distal end of the body.

11. The apparatus recited in claim 10, wherein the body is configured to position the electrodes at equal insertion depths in the conduit, wherein the body is configured to align the electrodes with each other along an axis that is perpendicular to the fluid flow direction in the conduit, and wherein the body is configured to align the at least one channel parallel to the fluid flow direction in the conduit.

12. The apparatus recited in claim 1, wherein the converging sidewalls of the at least one channel are configured to reduce the cross-sectional area of the at least one channel in order to increase the flow velocity of the electrically conductive fluid flowing through the at least one channel.

13. The apparatus recited in claim 1, wherein the first electrode is positioned in a first channel and the second electrode is positioned in a second channel.

14. The apparatus recited in claim 13, wherein the body is elongated, cylindrical, and has a central axis, wherein the first and second channels extend parallel to each other across a distal end of the cylindrical body, perpendicular to the central axis.

15. The apparatus recited in claim 14, wherein the sensor head is configured so that, in use, the central axis extends perpendicular to the fluid flow direction in the conduit and the channels extend parallel to the fluid flow direction in the conduit.

16. The apparatus recited in claim 1, wherein the body is overmolded onto the core, coil, frame, and electrodes.

17. The apparatus recited in claim 16, wherein the core, coil, and frame are assembled to each other prior to the body being overmolded.

18. The apparatus recited in claim 1, wherein the body comprises a non-cylindrical streamlined portion having a major axis oriented parallel to the at least one channel.

19. An apparatus for measuring flow in a conduit, comprising:
   a sensor head configured for insertion transversely through a conduit sidewall to position the sensor head in an electrically conductive fluid flowing through the conduit, the sensor head comprising:
   a core;
   a coil that at least partially surrounds the core, the coil being excitable to generate an electromagnetic field;
   first and second electrodes spaced apart from each other at a distal end of the sensor head; and
   a ferromagnetic frame comprising first and second legs that extend axially along the body on opposite sides of the coil, wherein the first and second legs extend axially beyond the first and second electrodes, wherein the first and second electrodes are positioned between the first and second legs, and wherein the first and second legs are configured to increase the flux density of the magnetic field in the vicinity of the first and second electrodes.

20. The apparatus recited in claim 19, wherein the core extends between and axially beyond the first and second electrodes, the core being configured to further increase the flux density of the magnetic field in the vicinity of the first and second electrodes.

21. The apparatus recited in claim 20, further comprising a body that supports the coil, the core, the frame, and the electrodes, the body comprising a distal end portion comprising:
   a central fin that extends between and axially beyond the first and second electrodes and in which the distal end of the core terminates; and
   spaced apart first and second wings that extend axially beyond the first and second electrodes, the first leg of the frame terminating in the first wing, the second leg of the frame terminating in the second wing, wherein the first and second electrodes are positioned between the wings.

22. The apparatus recited in claim 21, wherein the body further comprises:
   a first channel having a bottom wall upon which the first electrode is disposed and opposing sidewalls defined by the first wing and the fin; and
   a second channel having a bottom wall upon which the second electrode is disposed and opposing sidewalls defined by the second wing and the fin.

23. The apparatus recited in claim 22, wherein the opposing sidewalls of the first and second channels have a converging configuration.

24. The apparatus recited in claim 23, wherein the body is elongated and is configured to be inserted lengthwise into the conduit, wherein the first and second electrodes are aligned with each other along an axis that is perpendicular to the fluid flow direction in the conduit, and wherein the first and second channels are aligned parallel to the fluid flow direction in the conduit.

25. The apparatus recited in claim 23, wherein the converging sidewalls of the first and second channels are configured to reduce the cross-sectional areas of the first and second channels in order to increase the flow velocity of the electrically conductive fluid flowing through the first and second channels.

26. The apparatus recited in claim 22, wherein the body is elongated, cylindrical, and has a central axis, wherein the first and second channels extend parallel to each other across a distal end of the cylindrical body, perpendicular to the central axis.

27. The apparatus recited in claim 19, wherein the sensor head comprises a non-cylindrical streamlined portion having a major axis oriented parallel to the at least one channel.

* * * * *